(12) United States Patent
Danielson (10) Patent No.: US 10,393,301 B1
(45) Date of Patent: Aug. 27, 2019

(54) FLUID CONNECTORS WITH BELLOWS

(71) Applicant: FasTest, Inc., Roseville, MN (US)

(72) Inventor: Robert Danielson, Ham Lake, MN (US)

(73) Assignee: FasTest, Inc., Roseville, MN (US)

( * ) Notice: Subject to any disclaimer, the term of this patent is extended or adjusted under 35 U.S.C. 154(b) by 540 days.

(21) Appl. No.: 15/211,581

(22) Filed: Jul. 15, 2016

Related U.S. Application Data (60) Provisional application No. 62/192,803, filed on Jul. 15, 2015.

(51) Int. Cl.
*F16L 37/12* (2006.01)

(52) U.S. Cl.
CPC .................. *F16L 37/121* (2013.01)

(58) Field of Classification Search
CPC ....... F16L 37/121; F16L 51/02; F16L 51/025; F16L 51/03; F16L 27/107; F16L 27/11
USPC ............... 285/315–316, 375, 101, 226, 322
See application file for complete search history.

(56) References Cited

U.S. PATENT DOCUMENTS

| | | | | |
|---|---|---|---|---|
| 1,390,564 | A * | 9/1921 | Knorr | F16L 33/221 285/243 |
| 2,070,013 | A * | 2/1937 | Krannak | F16N 21/04 156/460 |
| 3,065,604 | A * | 11/1962 | Randol | B60T 11/20 60/567 |
| 3,459,444 | A * | 8/1969 | Rofe | F01N 13/1816 180/296 |
| 3,724,882 | A * | 4/1973 | Dehar | F16L 37/05 285/243 |
| 3,938,564 | A * | 2/1976 | Jones | B60K 15/04 141/352 |
| 4,257,449 | A * | 3/1981 | Takagi | F16L 25/08 137/505.25 |
| 4,621,937 | A * | 11/1986 | Maccuaig | B60T 11/04 285/192 |
| 4,909,131 | A * | 3/1990 | Nix | B60T 11/165 285/921 |
| 5,209,528 | A | 5/1993 | Weh et al. | |
| 2011/0005639 | A1 * | 1/2011 | Weh | F16L 37/121 141/311 R |
| 2016/0258563 | A1 | 9/2016 | Danielson et al. | |

* cited by examiner

*Primary Examiner* — Anna M Momper
*Assistant Examiner* — Fannie C Kee
(74) *Attorney, Agent, or Firm* — Hamre, Schumann, Mueller & Larson, P.C.

(57) ABSTRACT

A fluid connector having a connector body that is connectable to a first fluid system. The connector body includes a connection mechanism that is connectable to a tube of a second fluid system, and the connector body defines a fluid passageway that allows fluid to flow between the first fluid system and the second fluid system. A connector sleeve surrounds the connector body and is connected thereto, and the connector sleeve is actuatable relative to the connector body between a retracted position and a connected position. The connector sleeve actuates the connection mechanism as the connector sleeve is actuated from the retracted position to the connected position. In addition, the fluid connector is devoid of coil springs and dynamic seals.

10 Claims, 10 Drawing Sheets

FLUID CONNECTORS WITH BELLOWS

FIELD

This disclosure relates to fluid connectors that can be used to, for example, connect a first fluid system with a second fluid system for transferring fluids, including gaseous or liquid fluids, between the first and second fluid systems, or for sealing a fluid system using the fluid connectors.

BACKGROUND

Many examples of the use of fluid connectors to connect a first fluid system with a second fluid system are known. One type of fluid connector is described in U.S. Pat. No. 5,209,528. As described in this patent, collets are arranged to close around a tube under control of a retractable sleeve. The collets are not designed to put significant gripping pressure on the outside of the tube. Instead, the collets are designed to wedge between the tube and the sleeve, with a feature on the tube, such as a bead, barb, threads or the like, held by the collets. When the sleeve is in a locked position, the sleeve is over the collets and holds the collets in a collapsed position around the tube. When the sleeve is pulled backward to a retracted position against the biasing force of a spring, the collets are biased open by a biasing spring. Due to the construction of the collets and an internal piston within the fluid connector, the collets prevent the sleeve from being biased back to the locked position until such time as an end of the tube is inserted into the connector and the piston is pushed backward. Therefore, when the fluid connector is not connected to a tube, the collets are held open ready to receive the end of the tube, and the collets hold the sleeve back at the retracted position.

The type of fluid connector described in U.S. Pat. No. 5,209,528 is designed to work with a specific tube size having a specific configuration such as a bump, bead, barb, flare or the like. If one tries to connect to a tube having a larger or smaller diameter, or having a different configuration, the fluid connector will not attach or incorrectly attach to the tube permitting separation of the tube from the fluid connector during use. As a result, this type of fluid connector tends to be custom made for each tube configuration and size, so that a number of fluid connectors need to be produced for the various anticipated tube configurations and sizes to be encountered. Due to the custom manufacturing, these types of fluid connectors are expensive to manufacture, have long lead times to produce, and are costly due to the number of connections required.

SUMMARY

Fluid connectors are described herein that can be rapidly custom manufactured for a particular application. The fluid connectors can be made with minimal separate components to simplify the designs. In some embodiments, each fluid connector described herein can be designed to connect a first fluid system with a second fluid system for transferring fluids, including gaseous or liquid fluids, between the first and second fluid systems. In other embodiments, each fluid connector can be designed and used for sealing a fluid system using the fluid connector. In other embodiments, each fluid connector described herein can be designed for use in a manner similar to the fluid connectors described in U.S. Pat. No. 5,209,528. In some embodiments, the fluid connectors described herein can be designed for use in applications that do not require high pressure and where the fluid connectors do not need to last many years.

The fluid connectors can be completely constructed from and operate with one to three pieces, and without coil springs and without internal dynamic seals. In one embodiment, the fluid connectors can be formed out of, and operate with, two separate pieces. In another embodiment, the fluid connectors can be formed out of, operate with, a single piece of material.

In one embodiment, the fluid connectors described herein can be manufactured using additive manufacturing technology, also known as 3D printing. The connector body and the connector sleeve of the fluid connector can each be formed using additive manufacturing. In one embodiment, the connector body and the connector sleeve can be formed separately from one another, and then connected together. In another embodiment, the connector body and the connector sleeve can be integrally formed together as an integral, single-piece, unitary construction.

The fluid connectors described herein can perform all of the functions of a conventional fluid connector, such as the fluid connectors described in U.S. Pat. No. 5,209,528, but with fewer parts. The fluid connectors described herein can also be manufactured without coil springs and without internal dynamic seals that are required in connectional fluid connectors. In addition, since additive manufacturing can be used to form most or all of the pieces of the fluid connector, the fluid connectors can be manufactured much faster, at lower cost, and can be custom manufactured for a particular application. A fluid connector of the type described in U.S. Pat. No. 5,209,528 is typically constructed from 11 or more separate pieces that must be manufactured, assembled, and connected to one another to form the fluid connector.

DRAWINGS

FIG. 1 is a perspective view of a fluid connector described herein relative to a tube of a fluid system to be connected to.

DETAILED DESCRIPTION

A coil spring as used throughout the specification and claims, unless otherwise defined or indicated, refers to a helical spring formed by a wire that is wound in the shape of a coil. To be "devoid of coil springs" or the like means that the fluid connector does not have any coil springs, although other elements that provide a resilient biasing force can be present.

A dynamic seal as used throughout the specification and claims, unless otherwise defined or indicated, refers to a seal that is disposed between parts which are in relative motion (e.g. rotating, oscillating or reciprocating) with one another. To be "devoid of dynamic seals" or the like means that the fluid connector does not have any dynamic seals between moving parts thereof, although non-dynamic seals can be present.

Figure 1:
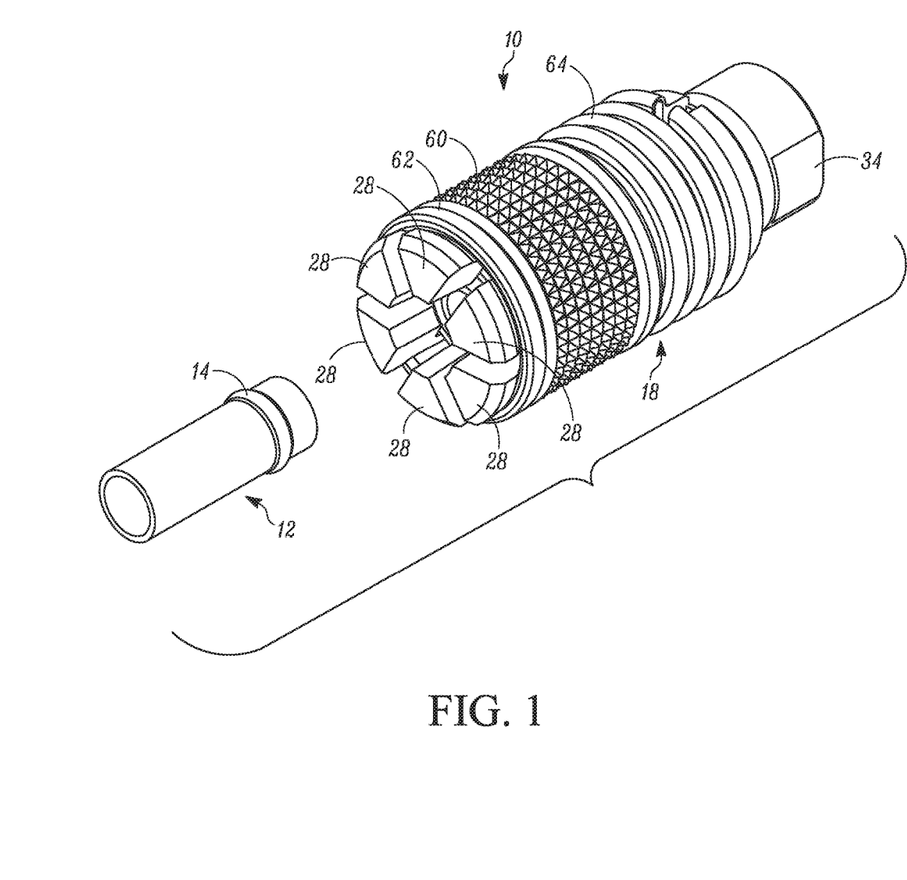
Figure 2:
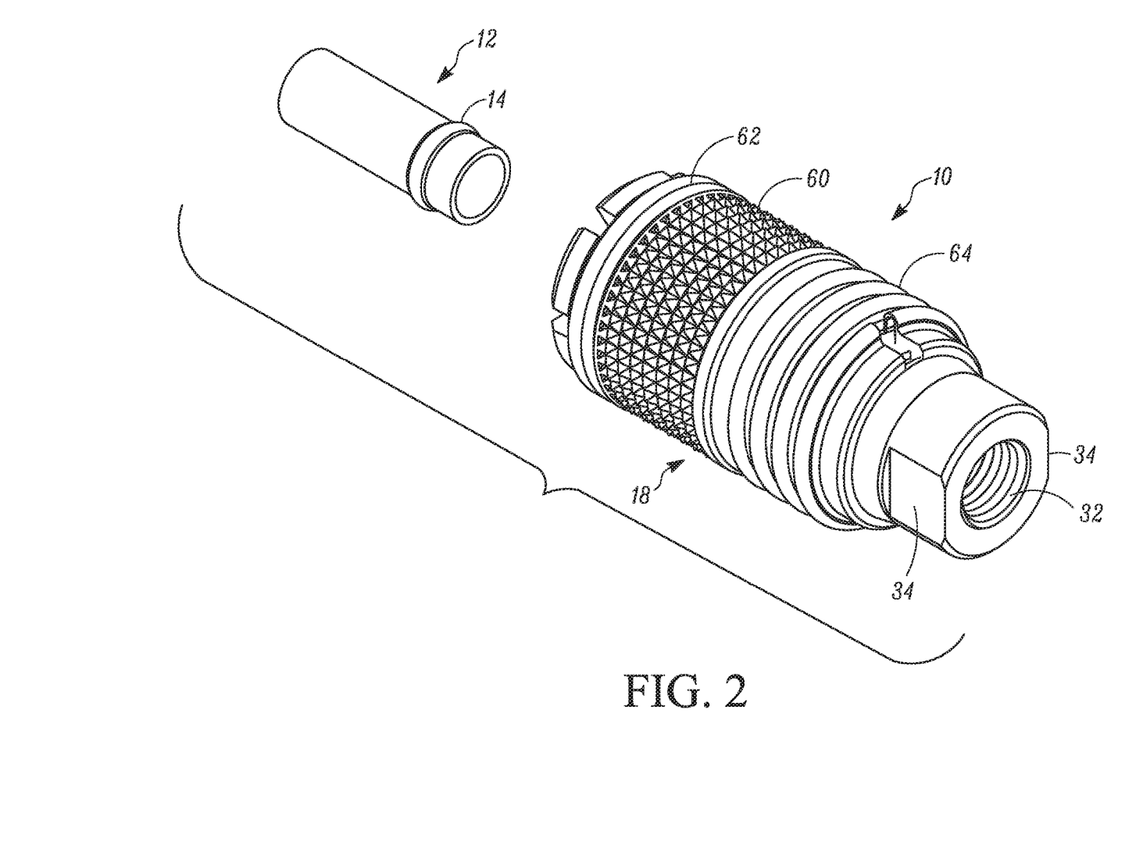
FIG. 2 is another perspective view of the fluid connector of FIG. 1.

With reference initially to FIGS. 1-2, a fluid connector 10 described herein is illustrated. In this example, the fluid connector 10 is a generally cylindrical construction. The fluid connector 10 is configured to be connected to a first fluid system (not shown), and the fluid connector 10 can then be used to connect to a tube 12 (or other structure the fluid connector 10 is to attach to) of a second fluid system (not shown) to place the first fluid system in fluid communication with the second fluid system through the fluid connector 10 for transferring fluids, including gaseous or liquid fluids, between the first and second fluid systems. In another embodiment, the fluid connector 10 can connect to a fluid system for sealing the fluid system using the fluid connector 10. U.S. Pat. No. 5,209,528, which is incorporated herein by reference in its entirety, contains further information on the purposes and functioning of fluid connectors that connect a first fluid system with a second fluid system.

The tube 12 includes a feature 14 thereon that aids in the ability of the fluid connector 10 to hold the tube 12 or other structure. For example, the feature 14 can be, but is not limited to, a protruding feature that can include, but is not limited to, a bead, barb, threads or the like. In other embodiments, the feature 14 can be a non-protruding feature such as a recess.

The fluid connector 10 is constructed from three identifiable elements, namely a connector body 16, a connector sleeve 18 and a main seal 20. In some embodiments described herein, these elements 16, 18, 20 may be formed separately from one another and then assembled together whereby the fluid connector 10 is formed from three pieces. In some embodiments described herein, the elements 16, 18 may be integrally formed together as a single unitary piece separately from the element 20, and then assembled together whereby the fluid connector 10 is formed from two pieces. In some embodiments described herein, the elements 16, 18, 20 may be integrally formed together as a single unitary piece whereby the fluid connector 10 is formed from a single or one piece.

Figure 3:
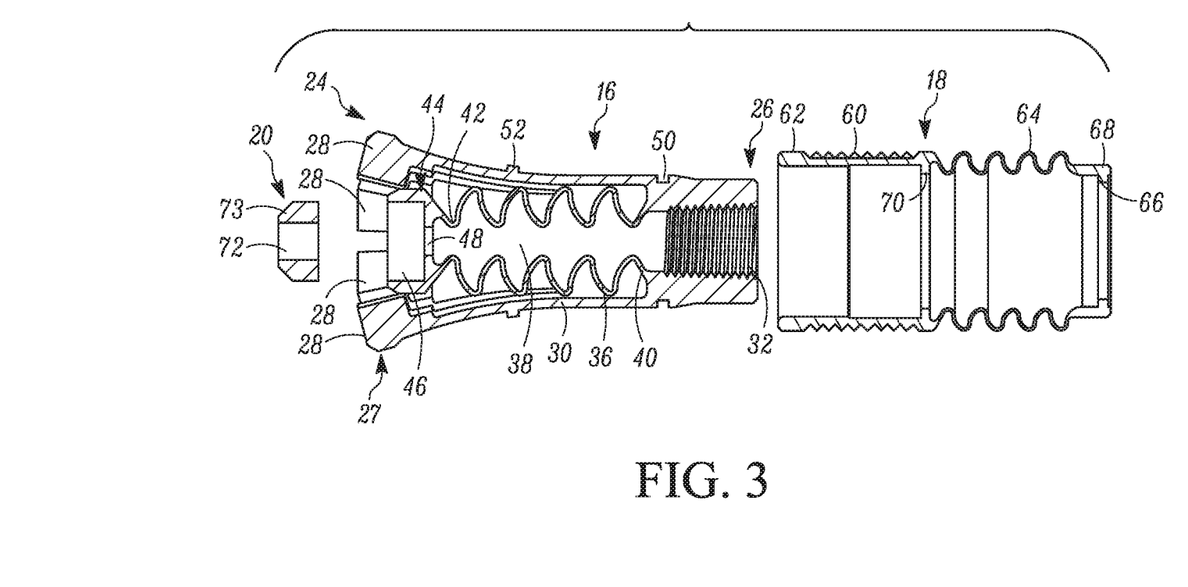
FIG. 3 is a cross-sectional, exploded view of the components of the fluid connector in one embodiment.

Referring to FIGS. 1-3, the fluid connector 10 is a three piece fluid connector with the connector body 16, the connector sleeve 18 and the main seal 20 formed separately from one another and then connected together to form the fluid connector 10. In this embodiment, the connector body 16 and the connector sleeve 18 can each be separately formed by using additive manufacturing (i.e. 3D printing). The connector body 16 and the connector sleeve 18 can be made from any materials that are suitable for use in additive manufacturing, such as, but not limited to, plastic or metal. The material used to form the connector body 16 and the connector sleeve 18 can be the same or different from one another. The main seal 20 can be formed using conventional manufacturing techniques or by using additive manufacturing. The main seal 20 can be made from rubber, plastic or metal, which can be the same as or different from the material used to form the connector body 16 and the connector sleeve 18.

The connector body 16 is generally cylindrical and includes a first or front end 24 and a second or rear end 26. The end 24 is integrally formed with a connection mechanism 27 designed to connect to the tube 12. The illustrated connection mechanism 27 comprises a plurality of retainment fingers 28. However, other forms of connection mechanisms 27 can be used. The connector body 16 is manufactured so that the retainment fingers 28 are made curved outwardly as depicted in FIG. 3 so that the retainment fingers 28 naturally or inherently are biased outwardly open requiring a force to collapse the retainment fingers 28 to a closed configuration. The retainment fingers 28 are split from one another to approximately a point 30 on the connector body 16 located between the ends 24, 26.

The end 26 of the connector body 16 can be formed with an internally threaded port 32 that permits threaded attachment to a suitable connection of the first fluid system. An outer or exterior surface of the connector body 16 at the end 26 can be formed with flats 34 or other features to permit engagement by a tool to aid in attachment of the fluid connector 10 to the first fluid system.

Internally, the connector body 16 is formed with a piston bellows 36 that defines an enclosed fluid passageway 38 that is in fluid communication with the port 32 as seen in FIG. 3. A rear end 40 of the piston bellows 36 is integrally formed with the interior of the connector body 16. A front end 42 of the piston bellows is integrally formed with a piston 44. The piston 44 includes a recessed region 46 that is designed to receive the main seal 20 therein (see FIG. 4). One or more openings 48 extend through the piston 44 to permit fluid to flow through the main seal 20, past the piston 44 and into the fluid passageway 38 (and vice versa).

As indicated above, the piston bellows 36 defines the fluid passageway 38 through the fluid connector 10. In addition, the piston bellows 36 functions similarly to a spring in that the piston bellows 36 has a normally expanded configuration but when the piston bellows 36 is collapsed, the piston bellows 36 biases the piston 44 in a forward direction (or to the left in FIG. 3). When the piston bellows 36 is expanded, the piston 44 is forced to the position shown in FIG. 3 so that the piston 44 holds the retainment fingers 28 in their open configuration and prevents collapse of the retainment fingers 28 to the closed configuration until the piston 44 is pushed backwards or toward the rear to collapse the piston bellows 36 as described further below.

With continued reference to FIG. 3, the connector body 16 further includes a circumferential channel 50 formed therein that is used to connect to the connector sleeve 18 in the manner discussed further below. In addition, the connector body 16 can include a stop feature 52, for example radial protrusions formed on exterior surfaces of the retainment fingers 28, that limits forward movement of the connector sleeve 18 on the connector body 16 as discussed further below.

As evident from FIG. 3, all of the elements (e.g. the connection mechanism 27, the piston bellows 36, and the piston 44) of the connector body 16 are integrally formed with one another so that the connector body 16 is an integrally formed, single piece construction.

Staying with FIGS. 1-3, the connector sleeve 18 is generally cylindrical and is designed to surround the connector body 16 and be connected thereto. The connector sleeve 18 is actuatable relative to the connector body 16 between a retracted position (shown in FIGS. 4 and 5) and a connected position (FIG. 6), and the connector sleeve 18 actuates the retainment fingers 28 of the connection mechanism 27 as the connector sleeve 18 is actuated from the retracted position to the connected position.

The connector sleeve 18 includes a gripping portion 60 at or near a forward end 62 thereof, and a sleeve bellows 64 positioned to the rear of the gripping portion 60. The gripping portion 60 is designed to enhance a user's grip on the connector sleeve 18 to facilitate manually retracting the connector sleeve 18 to the retracted position. The gripping portion 60 can be formed by any friction enhancing feature(s) that would enhance a user's grip on the gripping portions. Examples of friction enhancing features include, but are not limited to, knurling, one or more slots, grooves or channels, or the like.

The sleeve bellows 64 functions similarly to a spring in that the sleeve bellows 64 has a normally expanded condition, but when the sleeve bellows 64 is collapsed, the sleeve bellows 64 biases the forward end 62 and the gripping portion in a forward direction (or to the left in FIG. 3). In operation, the sleeve bellows 64 is designed to collapse to permit the forward end 62 of the connector sleeve 18 to be manually pulled back to the retracted position, with the resulting resiliency of the sleeve bellows 64 biasing the forward end 62 back toward the connected position. In one embodiment, the sleeve bellows 64 can form a solid continuous sleeve around the connector body 16, with the bellows geometry and the material used to form the connector sleeve 18 permitting manual retraction and the return biasing force. In another embodiment, since the connector sleeve 18 does not contain fluid flowing through the connector 10, the sleeve bellows 64 can be formed with one or more of slots, grooves, channels, variable material thickness, different material types, and any combinations thereof, to help tailor the stiffness characteristics of the sleeve bellows 64 to facilitate manual retraction and collapse of the sleeve bellows. In another embodiment, the material used in the additive manufacturing process to form the sleeve bellows 64 and/or the remainder of the connector sleeve 18 can be selected to help tailor the stiffness of the sleeve bellows 64 to facilitate manual retraction.

As evident from FIG. 3, all of the elements (e.g. the gripping portion 60, the sleeve bellows 64, etc.) of the connector sleeve 18 are integrally formed with one another so that the connector sleeve 18 is an integrally formed, single piece construction.

Figure 4:
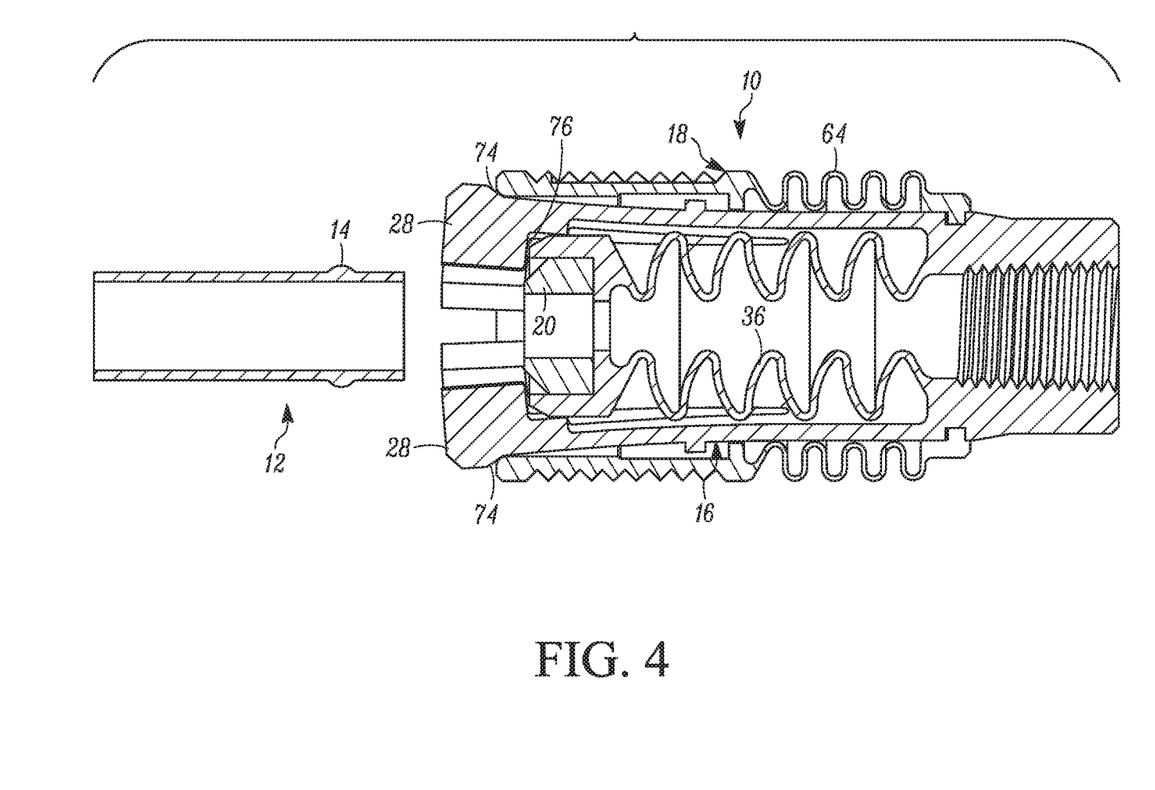
FIG. 4 is a cross-sectional view of the fluid connector ready for attachment.
Figure 5:
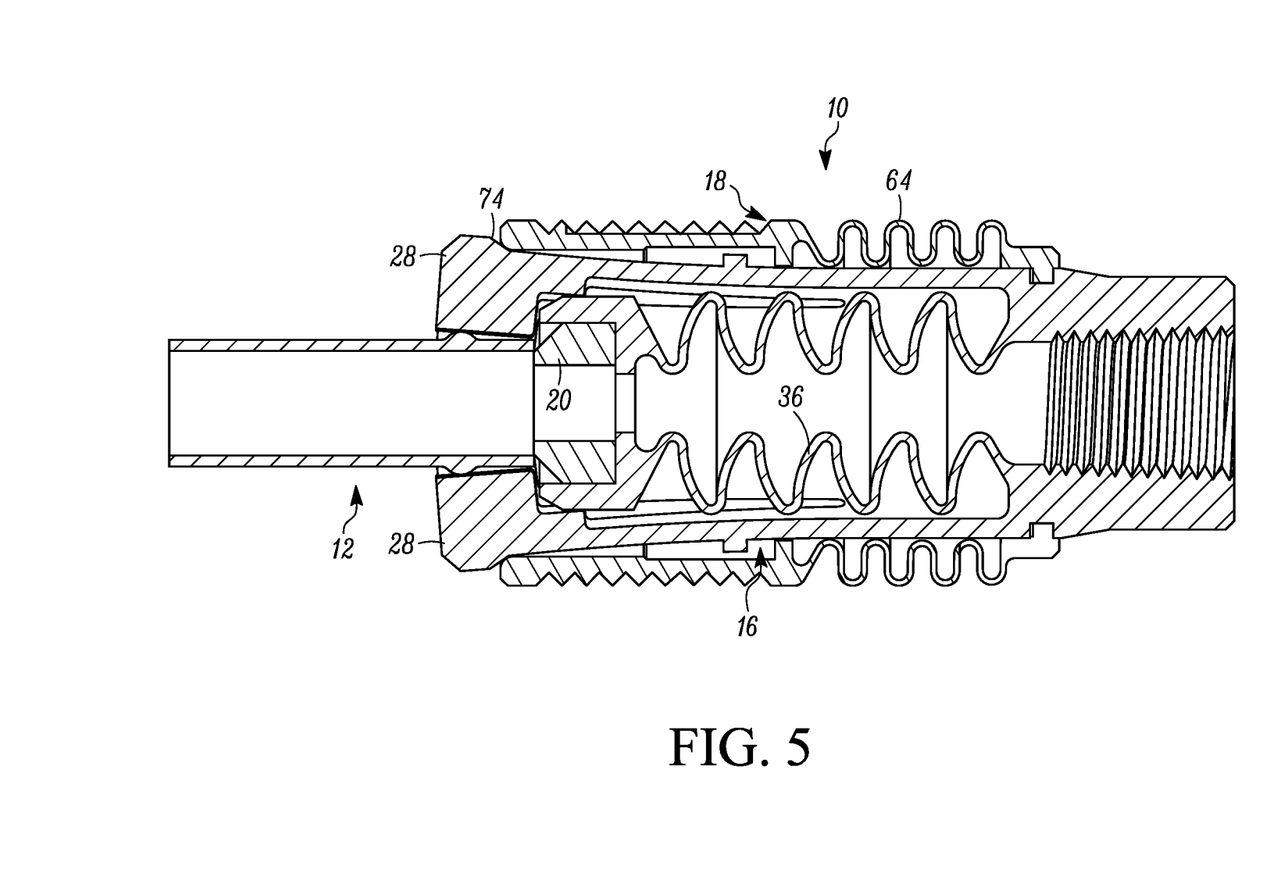
FIG. 5 is a cross-sectional view of the fluid connector at an intermediate stage of attachment.
Figure 6:
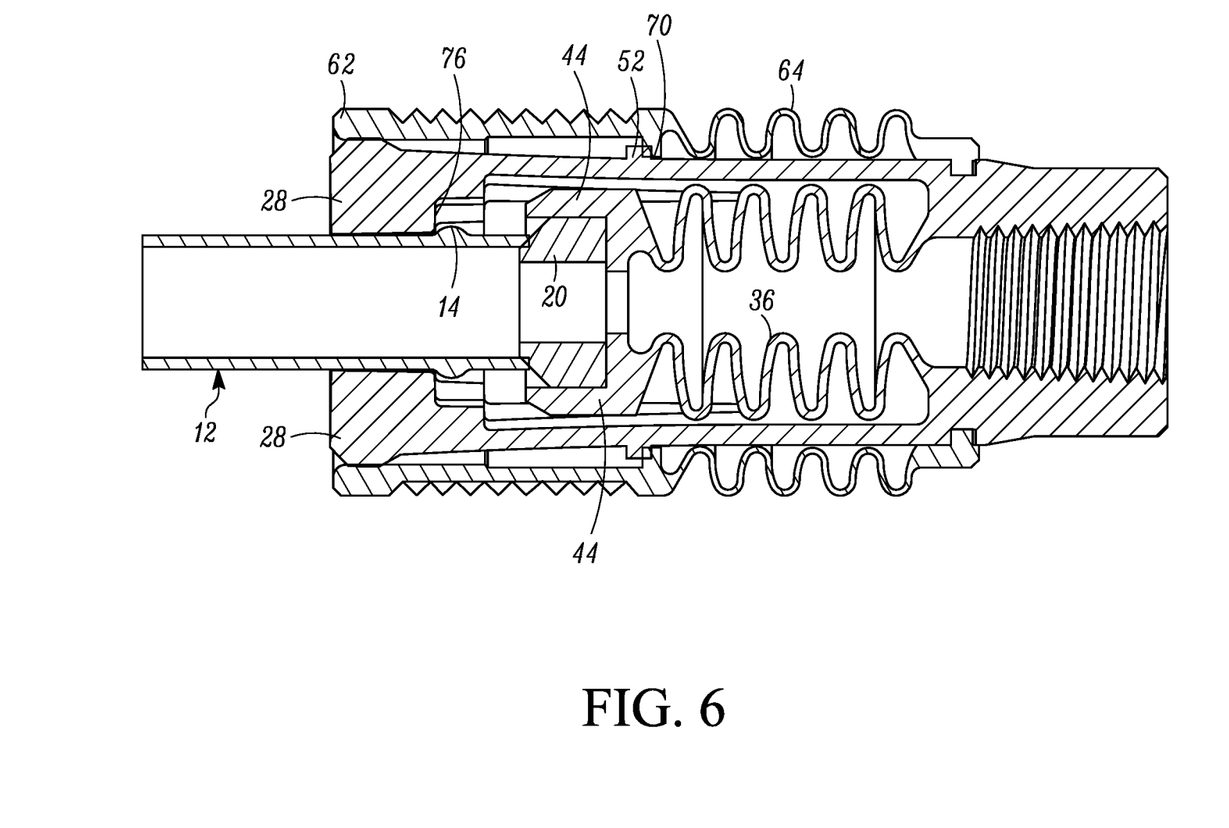
FIG. 6 is a cross-sectional view of the fluid connector attached to the tube.

The connector sleeve 18 is also formed with a rib 66 on an interior surface thereof adjacent to a rear end 68 thereof. As illustrated in FIGS. 4-6, the rib 66 is designed to engage within the channel 50 of the connector body 16 to connect the connector sleeve 18 to the connector body 16. In addition, a stop feature 70, for example a rib, can be formed on the interior surface of the connector sleeve 18 at a suitable location, for example at a longitudinal location between the gripping portion 60 and the sleeve bellows 64, that would engage with the stop feature 52 on the connector body 16, as shown in FIG. 6, to limit forward movement of the connector sleeve 18 relative to the connector body 16. The stop feature 70 can have any configuration suitable for engaging the stop feature 52 to limit movement of the connector sleeve 18. For example, the stop feature 70 can extend continuously in a circumferential direction, or the stop feature 70 can be circumferentially intermittent.

Returning to FIG. 3, the main seal 20 can have a cylindrical configuration with a central fluid passageway 72 that allows fluid to flow through the main seal 20. The main seal 20 is sized to fit into the recessed region 46 of the connector body 16 and be secured within the recessed region for sealing with the end of the tube 12. For example, the main seal 20 can fit within the recessed region 46 with an interference fit so that the main seal 20 is secured within the recessed region 46. However, other means of securing the main seal can be used separately from or in addition to the interference fit. When the main seal 20 is properly seated in the recessed region 46, the fluid passageway 72 is coaxially aligned with the opening 48, the fluid passageway 38, and the threaded port 32. A front end 73 of the main seal 20 is configured to engage with the end of the tube 12. In the illustrated example, the front end 73 is cone shaped but other shapes are possible. In the embodiment illustrated in FIG. 3, the main seal 20 can be formed from rubber or other elastomeric material suitable for sealing with the end of the tube 12. In other embodiments, the main seal 20 can be formed from plastic or metal.

With reference to FIGS. 4-6, an exemplary operation of the fluid connector 10 will be described. In FIG. 4, the fluid connector 10 is shown fully assembled and in a configuration ready for attachment to the tube 12. As evident from FIGS. 4-6, the fluid connector 10 is fully assembled and operational with only 3 pieces. The fluid connector 10 does not include any coil springs or any dynamic seals.

In this configuration, the piston bellows 36 is expanded and the retainment fingers 28 project past the end 62 of the connector sleeve 18, with ramp surfaces 74 on the outer surfaces of the retainment fingers 28 helping to hold the connector sleeve 18 back in the retracted position. The retainment fingers 28 are open due to their natural or inherent curvature, with the piston 44 engaged against inner shoulders 76 of the retainment fingers 28 helping to maintain the retainment fingers 28 open ready to receive the end of the tube 12.

FIG. 5 shows an intermediate stage of attachment with the end of the tube 12 initially introduced into the connector 10 and engaged against the main seal 20. The connector 10 otherwise remains as in FIG. 4.

With reference to FIG. 6, further introduction of the tube 12 into the connector 10 forces the piston 44 backward into the connector 10 which compresses or collapses the piston bellows 36. This allows the retainment fingers 28 to collapse to the closed configuration under the force of the end 62 of the connector sleeve 18 which is forced to the left in FIG. 6 by the expansion of the sleeve bellows 64 so that the connector sleeve 18 surrounds the retainment fingers 28. When the sleeve bellows 64 expands, the end 62 of the connector sleeve 18 rides up and over the ramp surfaces 74, forcing the retainment fingers 28 to collapse inwardly. The inner shoulders 76 of the retainment fingers 28 grab the tube 12 on the opposite side of the feature 14 to hold the tube 12. In addition, the stop 70 engages the stop 52 to limit the forward movement of the connector sleeve 18.

To disconnect, the user grips the gripping section 60 and pulls the connector sleeve 18 backwards to collapse the sleeve bellows 64. Once the end 62 clears the ramp surfaces 74 of the retainment fingers 28, the piston bellows 36 can expand which forces the piston 44 and the main seal 20 to the left in FIG. 6. Due to their inherent bias, the retainment fingers 28 are naturally biased outwards to their formed outward curved shape to their open configuration. The piston 44 slides up inside the shoulders 76 of the retainment fingers 28 to retain the retainment fingers 28 in an open configuration.

The piston bellows 36 and the sleeve bellows 64 can have any configuration suitable for performing the functions of the piston bellows 36 and the sleeve bellows 64 described herein. Many bellow configurations are possible beside those explicitly described and illustrated herein. The piston bellows 36 and the sleeve bellows 64 can have the same configuration as one another, or they can have different configurations from one another.

Figure 7A:
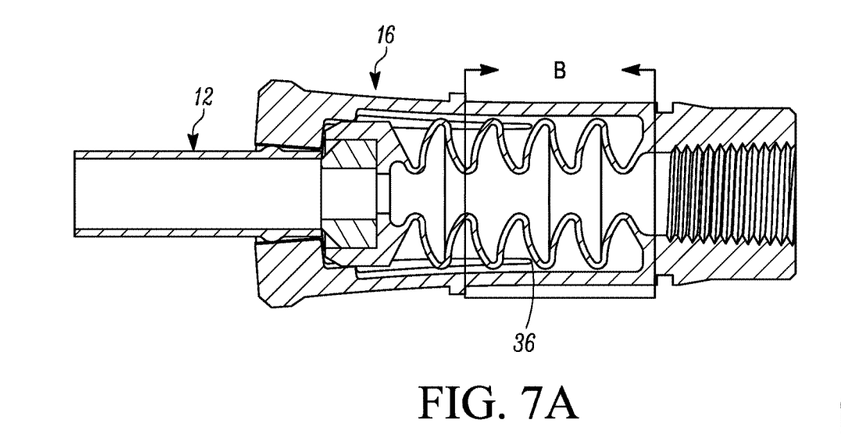
FIG. 7A is a view similar to FIG. 5, but with the connector sleeve removed.
Figure 7B:
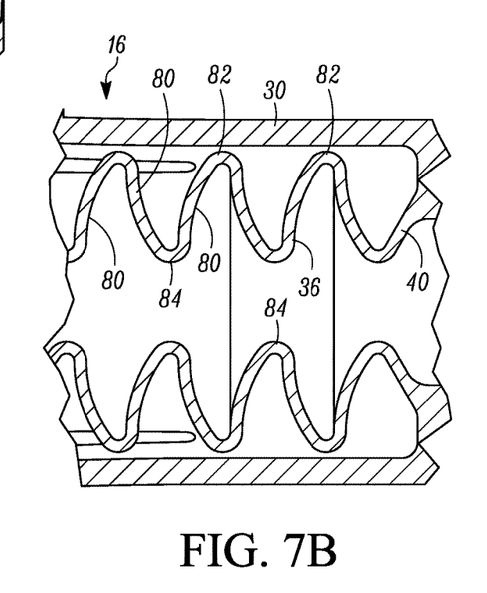
FIG. 7B is a close-up cross-sectional view of the area B in FIG. 7A.

For example, FIGS. 7A and 7B illustrate an example configuration of the piston bellows 36. However, a similar configuration can be used for the sleeve bellows 64. For sake of clarity, the connector sleeve 18 has been removed from FIG. 7A. FIG. 7B is a close-up view of the portion of the piston bellows 36 contained in the area B in FIG. 7A. In this example, the piston bellows 36 is formed by an alternating series of arched or concave webs 80 that are connected at radially outward peaks 82 and radially inward valleys 84. The arched webs 80 help to disperse stresses during collapse and expansion, thereby increasing the life of the piston bellows 36.

Figure 8A:
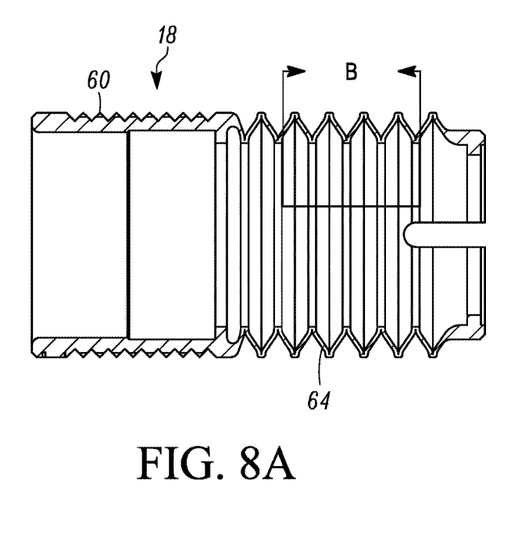
FIG. 8A is a cross-sectional view of another embodiment of the connector sleeve.
Figure 8B:
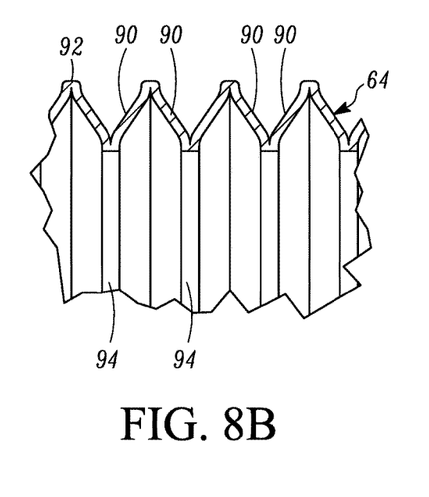
FIG. 8B is a close-up cross-sectional view of the area B in FIG. 8A.

FIGS. 8A and 8B illustrate an example configuration of the sleeve bellows 64 of the connector sleeve 18. However, a similar configuration can be used for the piston bellows 36. For sake of clarity, the connector sleeve 18 is shown by itself in FIG. 8A without the connector body 16. FIG. 8B is a close-up view of the portion of the sleeve bellows 64 contained in the area B in FIG. 8A. In this example, the sleeve bellows 64 is formed by webs 90 that when connected to one another generally form a plurality of Y-shapes with radially outward peaks 92 and radially inward valleys 94.

Figure 9:
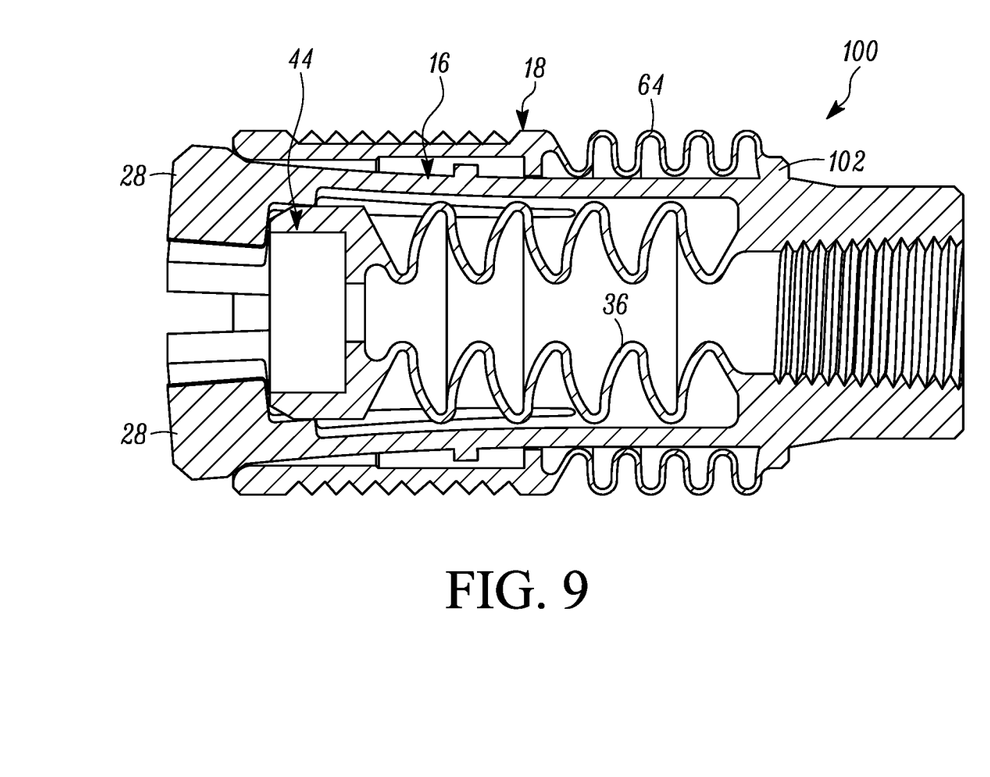
FIG. 9 is a cross-sectional view of another embodiment of the fluid connector where the connector sleeve and the connector body are one piece and a main seal is separately installed.

As indicated above, the fluid connector 10 described in FIGS. 1-6 is formed from 3 pieces. FIG. 9 illustrates another embodiment of a fluid connector 100 where the connector sleeve 18 and the connector body 16 are integrally formed using additive manufacturing as a single or one piece construction. The fluid connector 100 illustrated in FIG. 9 is a two-piece construction where the integral connector body 16 and the connector sleeve 18 form one piece, and a separately installed main seal (not shown, but similar in construction and location to the main seal 20) forms the second piece. In the fluid connector 100, the connector body 16 and the connector sleeve 18 are similar in construction to the connector body 16 and the connector sleeve 18 described above in FIGS. 1-6. However, the channel 50 and the rib 66 are not present in the connector 100. In place of the channel 50 and the rib 66, the connector body 16 and the connector sleeve 18 are integrally formed with one another at connection 102. The function and operation of the fluid connector 100 is otherwise identical to the function and operation of the fluid connector 10.

Figure 10:
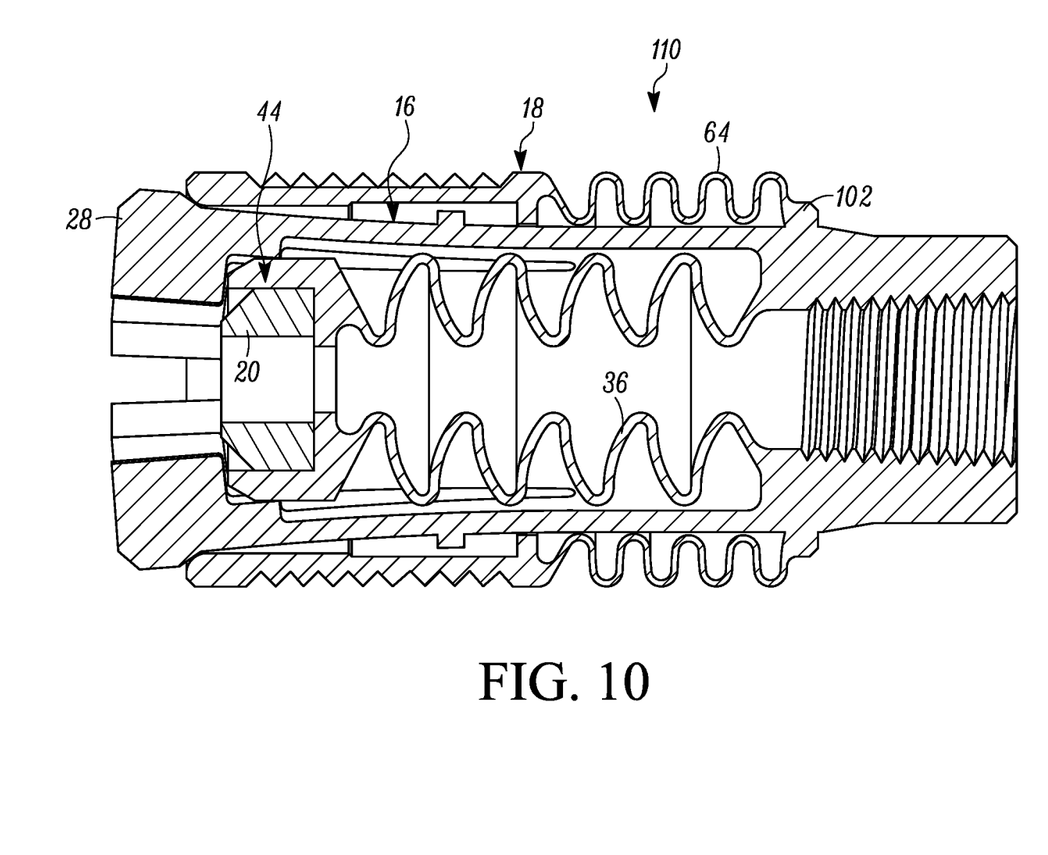
FIG. 10 is a cross-sectional view of another embodiment of the fluid connector that is similar to FIG. 9 but includes a main seal integrally formed with the connector sleeve and the connector body.

FIG. 10 illustrates another embodiment of a fluid connector 110 that is similar to the connector 100 in FIG. 9, but the connector sleeve 18, the connector body 16, and the main seal 20 are integrally formed using additive manufacturing. Therefore, the fluid connector 110 illustrated in FIG. 10 is a single piece construction, where the connector body 16, the connector sleeve 18, and the main seal 20 form one piece using additive manufacturing. In particular, a 3D printer can print different materials as it operates. Therefore, during formation of the fluid connector 110, one type of material (or different types of material) can be used to form the connector body 16 and the connector sleeve 18, while a different material (if necessary), for example rubber or other elastomer, can be used to print the main seal 20. As long as the material(s) used to form the connector body 16/connector sleeve 18 and the main seal 20 are of like chemistry, they will bond with each other. This permits the main seal 20 to be formed in the same additive manufacturing process as the connector body 16 and the connector sleeve 18. In the fluid connector 110, the connector body 16, the connector sleeve 18, and the main seal 20 are similar in construction to the connector body 16, the connector sleeve 18, and the main seal 20 described above in FIGS. 1-6. However, the channel 50 and the rib 66 are not present in the connector 110. In place of the channel 50 and the rib 66, the connector body 16 and the connector sleeve 18 are integrally formed with one another at connection 102. The function and operation of the fluid connector 110 is otherwise identical to the function and operation of the fluid connector 10.

In the constructions of FIGS. 9 and 10 where the connector body 16 and the connector sleeve 18 are integrally formed as one component, a secondary processing technique may be employed to gain the elasticity in the sleeve bellows 64. In the secondary processing, the connector sleeve 18 is stretched over the retainment fingers 28. A thermal set may be used for plastic and a cold form may be used for metal. This will reform the material used to form the connector body 16 and the connector sleeve 18 and allow for the sleeve bellows 64 to compress when retracted.

In all of the fluid connectors described herein, the fluid connectors are fully assembled and operational with a maximum of 3 pieces, and the fluid connectors do not include any coil springs or any dynamic seals between parts.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A fluid connector, comprising:
    a connector body that is connectable to a first fluid system, the connector body including a connection mechanism that is connectable to a tube of a second fluid system, and the connector body defining a fluid passageway that allows fluid to flow between the first fluid system and the second fluid system;
    a connector sleeve surrounding the connector body and connected thereto, the connector sleeve being actuatable relative to the connector body between a retracted position and a connected position, and the connector sleeve actuating the connection mechanism as the connector sleeve is actuated from the retracted position to the connected position;
    wherein the fluid connector is devoid of coil springs and dynamic seals; and
    the connection mechanism includes a plurality of retainment fingers; the fluid passageway is defined by a piston bellows; the plurality of retainment fingers and the piston bellows are an integrally formed, single piece construction; and the retainment fingers are inherently curved outward to an open configuration.

2. The fluid connector of claim 1, wherein the fluid connector consists of no more than 3 pieces including the connector body and the connector sleeve.

3. The fluid connector of claim 1, wherein the fluid connector consists of no more than 2 pieces including the connector body and the connector sleeve.

4. The fluid connector of claim 1, wherein the fluid connector consists of a single piece whereby the connector body and the connector sleeve are an integrally formed, single piece construction.

5. The fluid connector of claim 1, wherein the connector sleeve includes a gripping portion and a sleeve bellows positioned to a rear of the gripping portion, and the gripping portion and the sleeve bellows are an integrally formed, single piece construction.

6. The fluid connector of claim 5, wherein the sleeve bellows includes one or more slots, grooves, channels, variable material thickness, different material types, or combinations thereof that tailor the stiffness characteristics of the sleeve bellows.

7. A fluid connector, comprising:
a connector body that is connectable to a first fluid system, the connector body including a connection mechanism that is connectable to a tube of a second fluid system, and the connector body defining a fluid passageway that allows fluid to flow between the first fluid system and the second fluid system;
the connection mechanism including a plurality of retainment fingers; the fluid passageway being defined by a piston bellows; and the plurality of retainment fingers and the piston bellows being an integrally formed, single piece construction;
a connector sleeve surrounding the connector body and connected thereto, the connector sleeve being actuatable relative to the connector body between a retracted position and a connected position, and the connector sleeve actuating the connection mechanism as the connector sleeve is actuated from the retracted position to the connected position;
the connector sleeve including a gripping portion and a sleeve bellows positioned to a rear of the gripping portion, and the gripping portion and the sleeve bellows being an integrally formed, single piece construction.

8. The fluid connector of claim 7, wherein the connector body and the connector sleeve are an integrally formed, single piece construction.

9. The fluid connector of claim 7, wherein the sleeve bellows includes one or more slots, grooves, channels, variable material thickness, different material types, or combinations thereof that tailor the stiffness characteristics of the sleeve bellows.

10. The fluid connector of claim 7, wherein the retainment fingers are inherently curved outward to an open configuration.

* * * * *